(12) United States Patent
Hewit et al.

(10) Patent No.: US 7,769,841 B2
(45) Date of Patent: Aug. 3, 2010

(54) MANAGEMENT OF MEDIA CONTENT RATINGS INFORMATION COMMUNICATED DISCRETELY FROM MEDIA CONTENT

(75) Inventors: Ross F. Hewit, Sammamish, WA (US); John Bradstreet, Sammamish, WA (US); Bryan A. Woodruff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 11/451,182

(22) Filed: Jun. 12, 2006

(65) Prior Publication Data

US 2007/0288616 A1 Dec. 13, 2007

(51) Int. Cl.
G06F 15/173 (2006.01)
G06F 15/16 (2006.01)

(52) U.S. Cl. ........................ 709/223; 709/203; 709/227; 726/26; 726/27; 725/25

(58) Field of Classification Search ......... 709/202–203, 709/223–224, 227–229; 725/100, 114–117, 725/25, 39; 726/26–29
See application file for complete search history.

(56) References Cited

U.S. PATENT DOCUMENTS

| | | | |
|---|---|---|---|
| 5,485,518 A | 1/1996 | Hunter et al. | |
| 5,583,576 A | 12/1996 | Perlman et al. | |
| 5,678,041 A * | 10/1997 | Baker et al. | 709/229 |
| 5,828,402 A | 10/1998 | Collings | |
| 6,226,793 B1 | 5/2001 | Kwoh | |
| 6,643,715 B1 * | 11/2003 | Arthur | 710/14 |
| 6,684,240 B1 | 1/2004 | Goddard | |
| 6,732,367 B1 | 5/2004 | Ellis et al. | |
| 7,076,544 B2 * | 7/2006 | Katz et al. | 709/223 |
| 7,181,468 B2 * | 2/2007 | Spring et al. | 709/203 |
| 7,191,190 B2 * | 3/2007 | Debique et al. | 709/231 |
| 7,467,164 B2 * | 12/2008 | Marsh | 707/E17.009 |
| 7,499,993 B2 * | 3/2009 | Seo | 709/224 |
| 7,548,948 B2 * | 6/2009 | Klemets et al. | 709/203 |
| 2003/0037329 A1 | 2/2003 | Piotrowski et al. | |
| 2003/0154473 A1 | 8/2003 | Shin | |
| 2007/0204287 A1 * | 8/2007 | Conradt et al. | 725/25 |

FOREIGN PATENT DOCUMENTS

WO WO2004064377 7/2004
WO WO2005002180 1/2005

OTHER PUBLICATIONS

Yu et al., "An improved structure of pre-determined parental viewing control data in software design for ATSC receiver", IEEE Transactions on Consumer Electronics, vol. 48, Issue: 1, Feb. 2002.
Etzioni et al. "Controlling Television: Parental Filters", The Communitarian Network, May 1997, available at aladinrc.wrlc.org/bitstream/1961/611/1/etzioni-controlling-199705.pdf.
Eisenstock et al. "A Parent's Guide to the TV Ratings and V-Chip", Center for Media Education, Jul. 2000, available at i.ncta.com/ncta_com/PDFs/VChip%202000%20Brochure.pdf.

* cited by examiner

Primary Examiner—Bharat N Barot (57) ABSTRACT

A method, system and/or computer program product for managing the use of media content ratings information by a media content receiver, including communicating media content for presentation by a media content receiver; communicating media content ratings information for the media content, the media content ratings information being communicated discretely from the media content. The communicating operations include one or both of transmitting and receiving the content and/or ratings information.

20 Claims, 5 Drawing Sheets

MANAGEMENT OF MEDIA CONTENT RATINGS INFORMATION COMMUNICATED DISCRETELY FROM MEDIA CONTENT

BACKGROUND

Content ratings for television programs are conventionally communicated to the television receiver embedded in or otherwise with the broadcast data, also referred to herein as being communicated in-band. For analog transmissions, a byte pair is transmitted with the broadcast of the program content may be set aside for and contain the rating of the particular program. A V-chip or the like on the receiver can then read this byte pair and block the presentation of the program content if the particular user desires to block content having ratings above a particular level. This blocking level is programmed by the user into the receiver. For digital transmissions, e.g., ATSC, a legacy mechanism is available to block program content in the same sense as for analog. Further however, digital programming conventionally allows for the transmission, also in-band, of both ratings and a ratings schema by the broadcaster. Conventional ratings information of these types may then provide for blocking or filtering of content as well as for providing for display of the schema as for example in menu format by the receiver, or associated playback device. The ratings schemas or tables provide for looking-up content specific ratings and translation to a value that may be utilized by the TV user interface for blocking or filtering content, or for generating menus or guide information or for fulfilling other requirements.

Even so, such implementations may be improved. Parental control of media content may be improved particularly when and/or if ratings codes or schema are either non-existent in connection with media content or are otherwise not communicated with media content and/or when changes might have occurred to the ratings information for a particular bit of content, or to the rather global schema governing the content.

SUMMARY

Implementations described and claimed herein address the foregoing and other situations by providing methods, systems and/or devices for managing the use of media content ratings information by a media content receiver. These may provide for the communicating of media content for presentation by a media content receiver, and the communicating of media content ratings information for the media content, the media content ratings information being communicated discretely from the media content.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

Technology is described herein for managing media content ratings information, particularly in the transmission, reception and/or use thereof at a media content receiver. Generally, the media content ratings information is associated with particular media content, and thereby ultimately conveys information to the end user for the end user's use in determining whether and/or how to present such media content. As will be readily understood, such technology may be useful in and/or for a great many electronic media transmission or reception devices in a variety of media communication environments.

Figure 1:
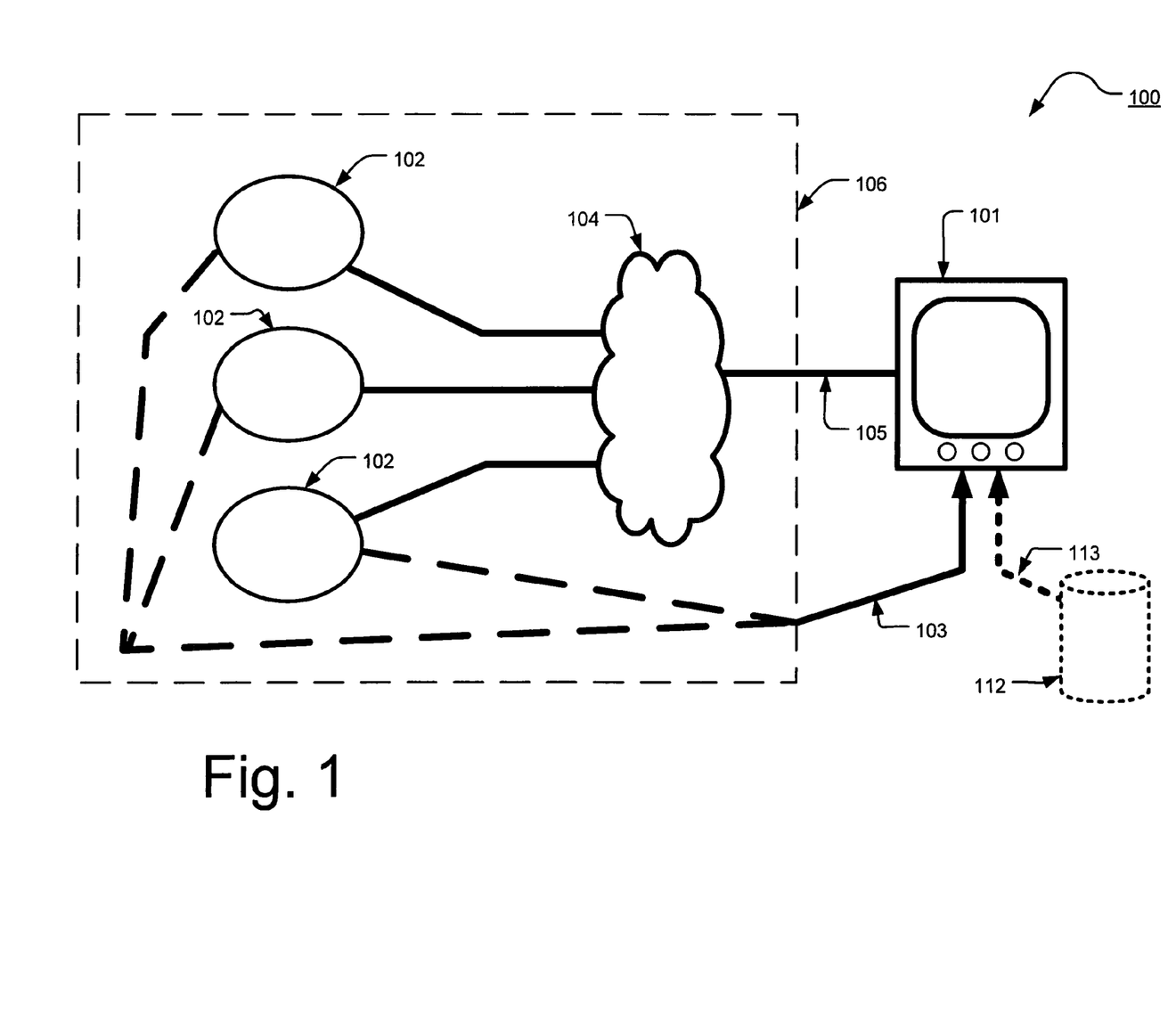
FIG. 1 is a schematic diagram of a system for communication of signals.

FIG. 1 illustrates a first example of a media communications environment 100 in which both media content and media content ratings information are communicated to a media content receiver 101. More particularly, two primary types of communications are shown being received by and transmitted to the media content receiver 101; namely, media content 103, which may be broadcast media content, internet streaming media content, or other content as described below, and media content ratings information 105. In this implementation, the media content 103 may also be referred to as or is communicated by a media content signal, and is the content that is communicated for ultimate presentation on or by a media content receiver such as a television (TV), set-top box, personal computer (PC), smartphone, personal audio and/or video player, or a mobile digital device or other content receiving and/or presentation device. The media content ratings information 105 is information associated with the media content and may also be referred to as or is communicated on or by a ratings information signal. Note, both the media content 103 and the media content ratings information are represented in FIG. 1 by respective lines moving to the receiver 101, each such line also being alternatively indicative of a conveyance means, such as a cable, for the communication of the respective content 103 and/or ratings information 105; these lines thus also depicting media content communications. However, such lines are not intended to be limiting to either the form of communication or means thereof as communication may be by wireless (e.g., Wi-Fi or other non-hard-wired means) or other alternative or additional means as well.

As shown in FIG. 1, the media content ratings information 105 for the media content 103 is discrete from the media content 103 and the ratings information signal is communicated discretely from and/or is disassociated from the media content signal. Even so, there may be some ratings information (not shown or otherwise described) embedded in or otherwise communicated in-band with media content 103. In such instances, the content ratings information 105 may be identical with or may include supplemental information for use in addition to or in lieu of the embedded information. Examples of this are set forth in greater detail below.

Also shown in FIG. 1 are one or more content providers or content sources 102 which supply the media content 103, as well as the discrete ratings information 105. Further included is a network 104, through with the ratings information may be communicated to the receiver 101. In some instances, the network 104 may be the internet, or another information and/or data communications entity, whether an open or closed or a local area, wide area communications network. A box is indicated generally at 106 to separate and identify the information and content sources generally as opposed to the receiver 101. The information and content sources represent the service side 106 as opposed to the client side 101 of the communications contemplated herein. In some views, the communications are transmissions from the services 106, where in other views, the communications are receptions by or at the client receiver 101. Thus, communication herein is either or both transmission or reception.

It may be further noted that though broadcast or internet streaming communications of media content or ratings information are some of the primarily considered forms for transmission and/or reception contemplated herein, other forms are available as well. As shown in dashed lines in FIG. 1, for example, a data library 112 may communicate content 113 to the receiver 101 here as well. If so, ratings information for such content may also be obtained discretely from the content 113 via the ratings information 105 whether pushed from the services 106 and/or pulled by the receiver 101 therefrom. Though not shown within the services box 106, the library 112 may be considered a service device in providing content and/or information to or for the receiver 101. Even so, it could be incorporated within the receiver 101 or as part of the receiver 101, as a memory or the like (e.g., even acting post-reception in recording received content or information), and thus rather schematically act as a service device. Moreover, though not separately shown, other means for communicating the media content or the ratings information may also be available, as by communication through a similar data library, or other data communications device such as a floppy disk, compact disc (CD), other memory device, such as a memory stick, smart card, via wireless, Wi-Fi, or via a telephone signal or text message, inter alia.

Figure 2:
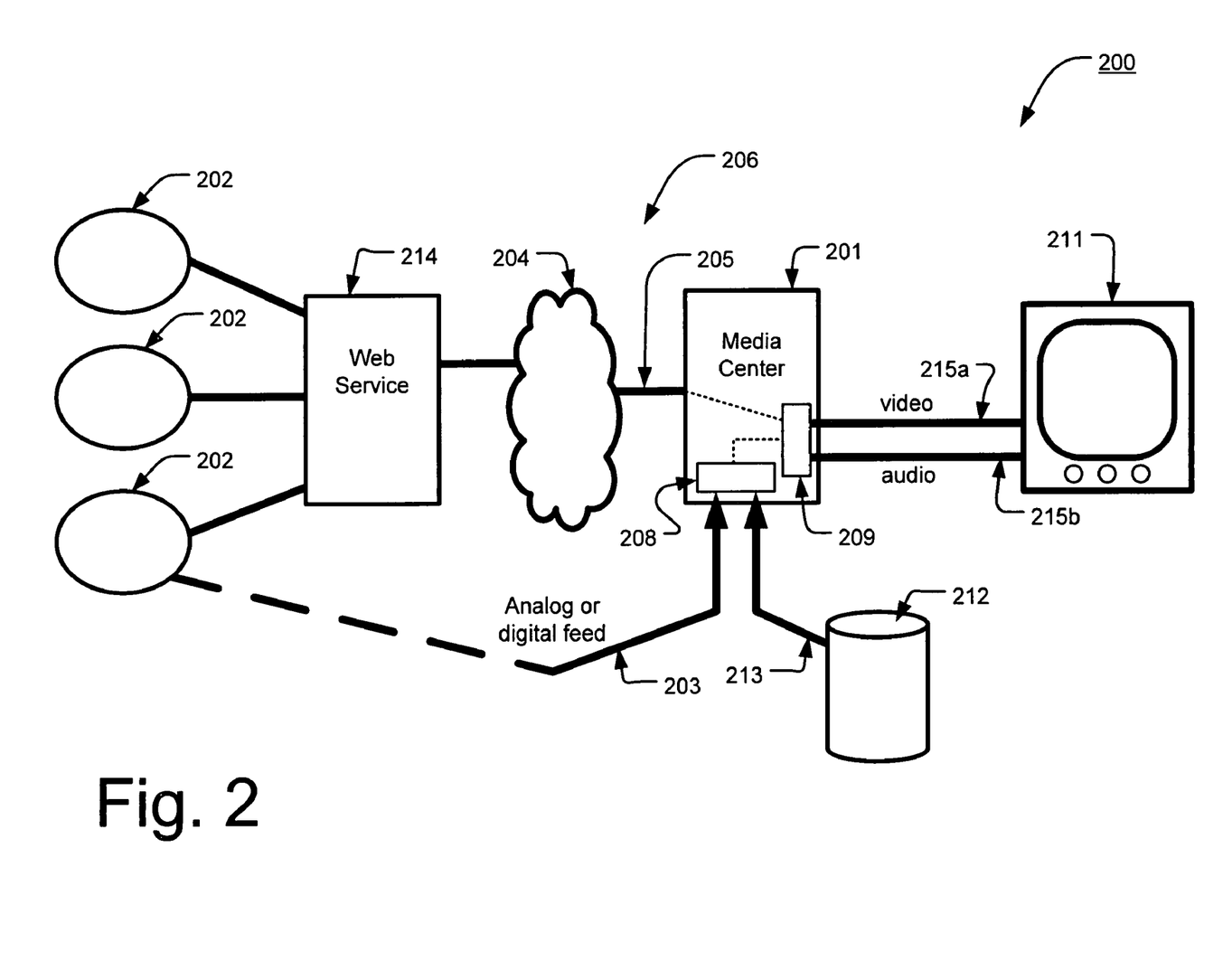
FIG. 2 is another schematic diagram of a system for communication of signals.

FIG. 2 shows some further alternatives of discrete content and ratings information in an alternative environment 200. The receiver 201 here is shown as an intervening media receiving device or media center which transmits to a display or presentation device 211 (e.g., a television or personal video or audio player, or the like). Thus, it may be that the receiver 201 may perform any management functions based on the received content 203 and the received ratings information 205 prior to communication to the presentation device 211. The communication from the receiver 201 to the presentation device 211 is shown how it might occur via separate video and audio lines 215a and 215b; and, these could be even more specifically S-video and/or stereo audio, inter alia. This is but one example, as one or more communication lines might convey both audio and video together, and/or here also, the communication might be by other than a physical line, as in wireless, Wi-Fi, Bluetooth, infrared or by other means.

As before, content services 206 may include one or more content sources or providers 202 which provide both content and ratings information. An intervening network 204, such as the internet, might be involved in the communications of the ratings information 205. Here however, a further intervening service, here called a web service 214 might be used to collect the ratings information from one or more content providers 202, such as broadcasters or internet stream providers. As described further below, the web service 214 could contribute further intelligence and or information to the overall category of ratings information as well.

Additional alternatives shown in FIG. 2 include the provision of a tuner card 208 and/or a video and/or audio card 209 in the receiver/media center 201 for appropriately processing the incoming and outgoing communication signals, which may include the media content and ratings information. This may include the ability to process incoming digital or analog feeds 203 as well as providing for reception and/or transmission of non-broadcast content as from a library 212 communication 213.

In operation, the content feed 203, whether analog or digital, may be simple content with either no ratings information embedded therein, or it may contain some in-band ratings information attached thereto as is conventionally understood, as for example, with a byte pair identifying the programming rating of the program content thereof. For example, the content may be a television program or show broadcast with a byte pair identifying the program and its particularly imposed rating code (e.g., TV-G, TV-PG, TV-MA, inter alia). Then, also as is conventionally understood, the receiver 101 or 201 may have a chip (e.g., a V-chip) or other logic which can interpret the rating and then perform a function, as programmed by the end-user, such as allowing the playback or blocking the playback (as for example of all TV-MA content). Also according to convention, the ratings information embedded on or within a digital content feed may include ratings schema as also sent from the broadcaster or internet streamer.

These functionalities may, though need not, be retained in the presently-described environments 101, 201. Rather, a more flexible, and typically more inclusive alternative ratings information communication 105, 205 may be provided to work with or in lieu of the embedded in-band ratings information, if any. Thus, a first implementation may involve the supply of ratings information for programming content which may not have such information embedded therein. In a simple case, the rating code (TV-G, TV-PG, TV-MA, etc.) for a particular TV show or program could be obtained, whether pushed by the service(s) 106, 206 or pulled by the receiver 101, 201. This may occur more frequently with uncontrolled, or at least perhaps inconsistently controlled content obtained from sources such as internet streaming. However, as a slight variation in a further implementation, the ratings information communication 105, 205 may be supplementary to any embedded ratings information, but, may nevertheless provide value to the end-user in addition to or in lieu of the embedded information inasmuch as the embedded data may carry merely the ratings code (TV-G, TV-PG, TV-MA, etc.) without other potentially helpful information such as the cause for the rating, whether for dialog, language, violence or the corresponding moving rating or foreign rating information or the like. Some end-users may prefer to use such additional information to program the blocking or unblocking features available to the end user in or via the receiver 101, 201.

Figure 3:
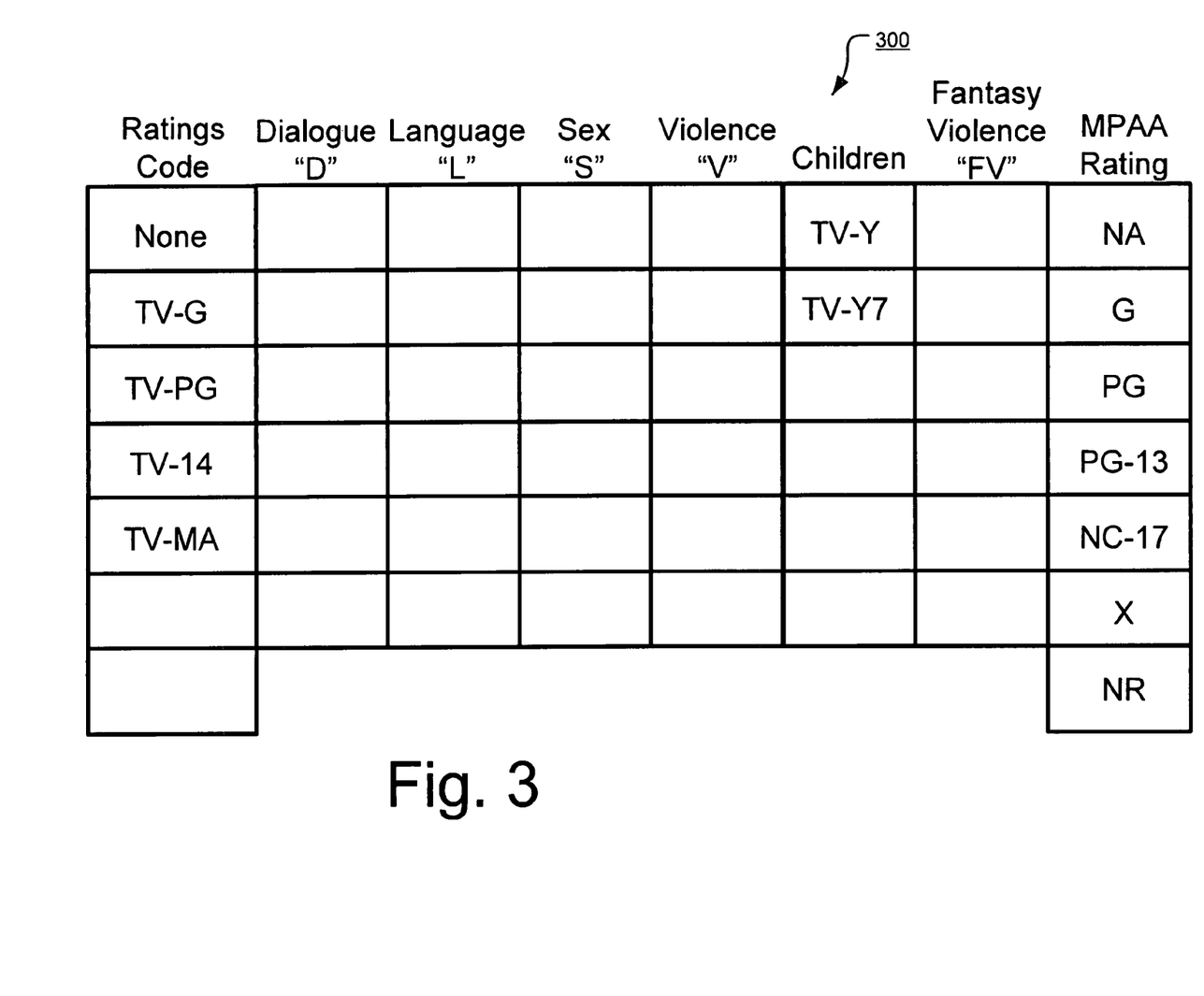
FIG. 3 is a sample ratings information schema useful herewith.

In a further alternative of this variation, the ratings information which may be communicated via information 105, 205 may be ratings schema such as the global schema 300 shown in FIG. 3 (a version of the Consumer Electronics Association CEA-766-A Region Rating Table). Note, a great many variations and/or combinations of the data in the table of FIG. 3 can be set for any particular program. For example, see the combinations set out in TABLE A, below:

TABLE A

| No Message | TV-None | TV-Y | TV-Y7 |
|---|---|---|---|
|  |  |  | TV-Y7-FV |
| TV-G | TV-PG | TV-14 | TV-MA |
|  | TV-PG-D | TV-14-D | TV-MA-L |
|  | TV-PG-L | TV-14-L | TV-MA-S |
|  | TV-PG-S | TV-14-S | TV-MA-V |
|  | TV-PG-V | TV-14-V | TV-MA-L-S |
|  | TV-PG-D-L | TV-14-D-L | TV-MA-L-V |
|  | TV-PG-D-S | TV-14-D-S | TV-MA-S-V |
|  | TV-PG-D-V | TV-14-D-V | TV-MA-L-S-V |

TABLE A-continued

| | |
|---|---|
| TV-PG-L-S | TV-14-L-S |
| TV-PG-L-V | TV-14-L-V |
| TV-PG-S-V | TV-14-S-V |
| TV-PG-D-L-S | TV-14-D-L--S |
| TV-PG-D-L-V | TV-14-D-L-V |
| TV-PG-D-S-V | TV-14-D-S-V |
| TV-PG-L-S-V | TV-14-L-S--V |
| TV-PG-D-L-S-V | TV-14-D-L-S-V |
| MPAA-N/A | |
| MPAA-G | |
| MPAA-PG | |
| MPAA-PG13 | |
| MPAA-R | |
| MPA4-NC-17 | |
| MPAA-X | |
| MPAA-Not Rated | |

Note this is a United States standard; however, several other countries have or may adopt similar ratings tables, see e.g., Argentina, Korea, Mexico and France, inter alia.

It may be that all ratings, elements are indices into the FCC mandated Region Rating Table (RRT) rather than fixed strings. As such only the Region Ratings Table is used to map stored ratings into user interface (UI) elements. For example, ratings menus and content blocked dialogs will be built dynamically from the RRT.

Data such as that shown in TABLE A is certainly more than a mere rating; however, it may be that fewer programs will have such data embedded therein. Thus, it may be advantageous to have such ancillary information available for communication other than in-band with a particular program, whether it is broadcast or internet streamed, or otherwise. Note, the use of such tabular information for management of ratings for parental controls at/by a receiver 101/201 is conventionally understood (e.g., a combination from TABLE A, built from the Table 300 in FIG. 3 may generate a numerical value which can be used by the receiver 101/201, as programmed by the end-user, to alternatively block or allow the corresponding programming to be presented by the receiver 101/201 and/or presentation device 211 controlled thereby). A variation of this might involve the use of a potentially conventional embedding of such schema ratings information within the media content; however, with alternative communication of the schema via the discrete ratings information communication 105, 205, and thus a use of either the in-band information or the discrete ratings information including the schema. Again, it may be that the non-in-band information 105, 205 may have either additional information, or formatting or other qualities superior to the in-band information.

Moreover, changes to such schema are appreciated as possible and/or likely; however, how particular devices and/or content providers might respond to any such changes is not well appreciated. Thus, a separate communication of ratings information 105, 205 as contemplated here, which may include such schema, and particularly any changes thereto, can provide an approach for adequately communicating and correctly using the schema, and particularly any schema changes. For example, an entire new category may be added to the CEA standard schema (see e.g., FIG. 3), such as by deleting or adding an additional rating code (perhaps a TV-17, e.g., or an entire new MPAA code), or by adding an entirely additional column of data (e.g., something additional to the dialog, language, sex, etc. categories) or even deleting one (such an update may occur after an FCC mandate, for example). This could then either directly affect the programming being received; either the programming may have a changed ratings code as a result, or the end-user may need or want to change the threshold values for blocking and so forth. Making the ratings information obtainable other than by in-band communication may provide a desirable alternative for updating the receiver 101, 201 and/or the programming thereof; particularly before a content provider may have communicated such changes.

As a variation of this, the receiver may detect via programming/media content 103, 203 that a change in the schema may have occurred without it being recognized by the receiver 101, 201 what the new schema represents. In such a case, the receiver 101, 201 may then obtain, by querying, for example, through the non-in-band communication 105, 205 for updated ratings information. In a particular implementation, the receiver 101, 201 may particularly query the media source 102, directly, or more typically, query the intervening web service 214 via the non-in-band communication 105, 205 to obtain the desired information. The end-user may then update its ratings management accordingly. As a further alternative, the receiver 101, 201, might instead merely note the discrepancy of a new schema provided in-band whether the media content itself includes a corresponding new code or not (i.e., the particular content may nonetheless still be coded according to the previously accepted schema), and determine to block or otherwise filter the media content having the new in-band schema. Thus, the management controls programmed into the receiver may be effectively out of date, and new programming content may be blocked until an appropriate new schema is downloaded and the management controls appropriately updated. This may be a pre-determined alternative for the end-user to decide, or may be hard-coded. (Note, current receiver parental ratings implementations (via analog XDS) are entirely static and do not adapt to new or updated ratings systems.) Thus, in a variation, the receiver may be hard coded to a particular schema, which then blocks content if the receiver does not have appropriate schema as carried by this program.

A further variation is to provide for flexible display of the schema and/or menus or other user interface elements based upon the schema. This may be advantageous particularly if the schema has changed. Conventional receivers are typically hard-coded with menu and/or other display structures based upon the schema; however, if an entirely new column is added to the schema, a conventionally hard-coded menu structure may not be able to present the new category of information in a user friendly manner. The ancillary ratings information may include menu, layout or other display configuration information for presentation of the ratings schema and/or the ratings codes for management thereof by the end-user.

Figure 4:
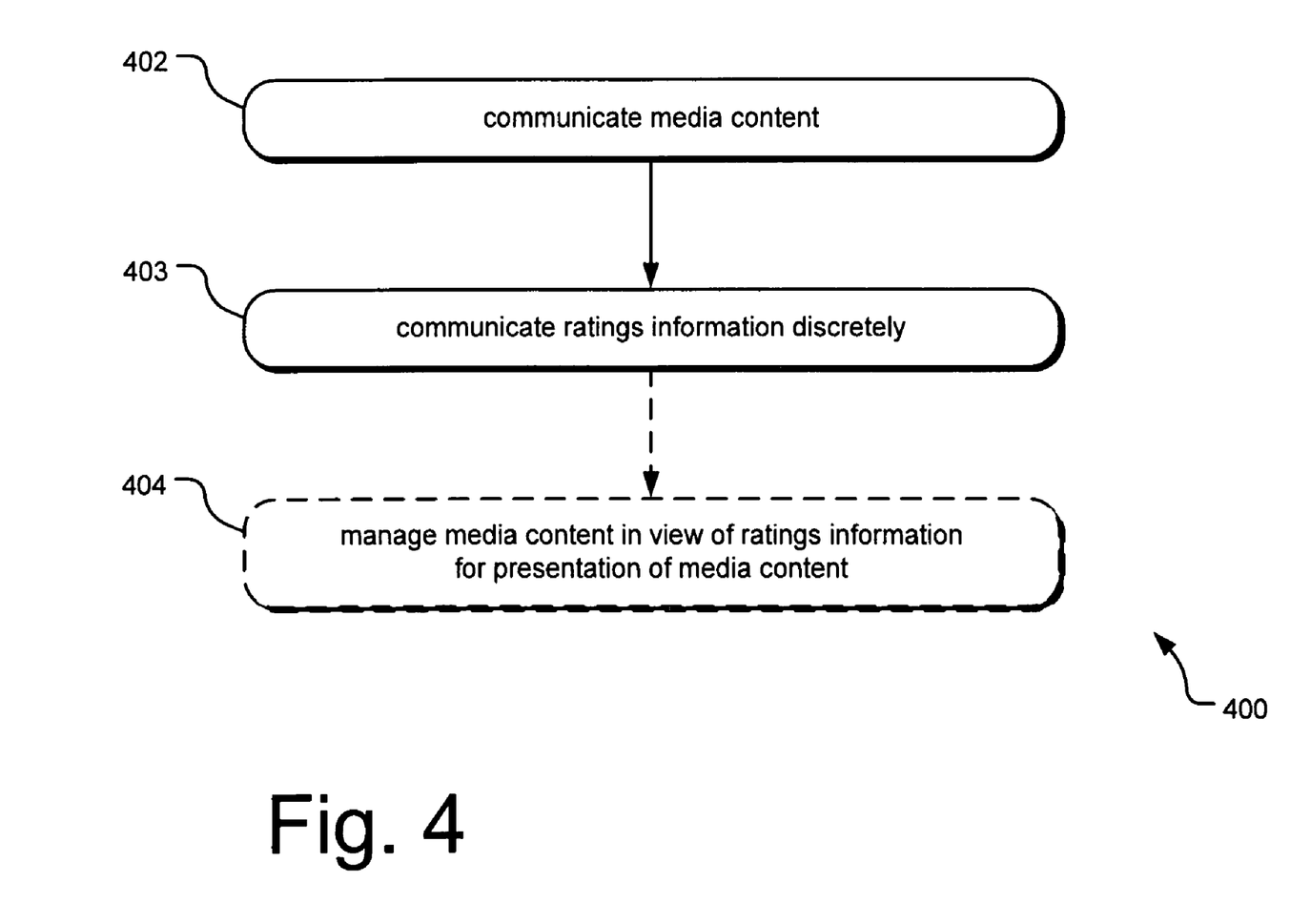
FIG. 4 illustrates example operations for the present technology.

FIG. 4 shows a general process 400 according to this technology, the process involving an operation 402 for communicating media content for presentation by a media content receiver; an operation 403 for communicating media content ratings information for the media content, the media content ratings information being communicated discretely from the media content. These communicating steps may be defined as including one or both of transmitting and receiving the media content and/or the media content ratings information. The media content may also contain in-band media content ratings information communicated therewith.

In this process, the media content may also provide for determining a change in the in-band media content ratings information. It may further provide for communicating, in response to the determining of a change, media content ratings information discretely from the media content ratings information. Blocking presentation of media content may also be provided as might unblocking the presentation of media content, particularly after obtaining the media content ratings. It may further be that the a difference in the in-band media content ratings information is relative to one or more of the in-band ratings information, the ratings information communicated discretely from the media content and ratings information hard-coded in the media content receiver.

In some implementations, the ratings information may include one or both of a rating code and a ratings schema. Ancillary ratings information may also or alternatively be concluded as well. This ratings information may be used for presentation of the ratings information for management thereof by the end-user.

The media content receiver may be one or both of digital or analog. The media content receiver may be one or more of a television (TV), set-top box, personal computer (PC), smartphone, personal audio and/or video player, or a mobile digital device. The communicating of the ratings information may be through a data library, or other data communications device such as a floppy disk, compact disc (CD), other memory device, such as a memory stick, smart card, by USB, flash memory via wireless, wi-fi, or via a telephone signal or text message.

Processes hereof may further include, as shown in dashed lines in FIG. 4, an operation 404 for managing presentation of the media content by the media content receiver in accordance with the media content ratings information. Such a managing functionality may include one or more of presenting the ratings information for end-user decision-making, blocking, filtering and presenting guide information in an arrangement based on ratings information criteria.

In some implementations, improvement may be in a computer program product for managing the use of media content ratings information by a media content receiver, the computer program product including means for communicating a media content signal for presentation of media content by a media content receiver; and means for communicating a media content ratings information signal for the media content signal, the media content ratings information signal being communicated discretely from the media content signal. In further alternatives, systems may be provided for the use of parental ratings information including a media content receiver for receiving both media content for presentation by the media content receiver; and, media content ratings information for the media content, the media content ratings information being received discretely from the media content.

A variety of advantages may be provided by such implementations. Parental controls of programmed media content may be improved particularly when and/or if ratings codes or schema are either non-existent on or with received content and/or when changes might have occurred to the ratings information for a particular bit of content, or to the rather global schema governing the content.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Figure 5:
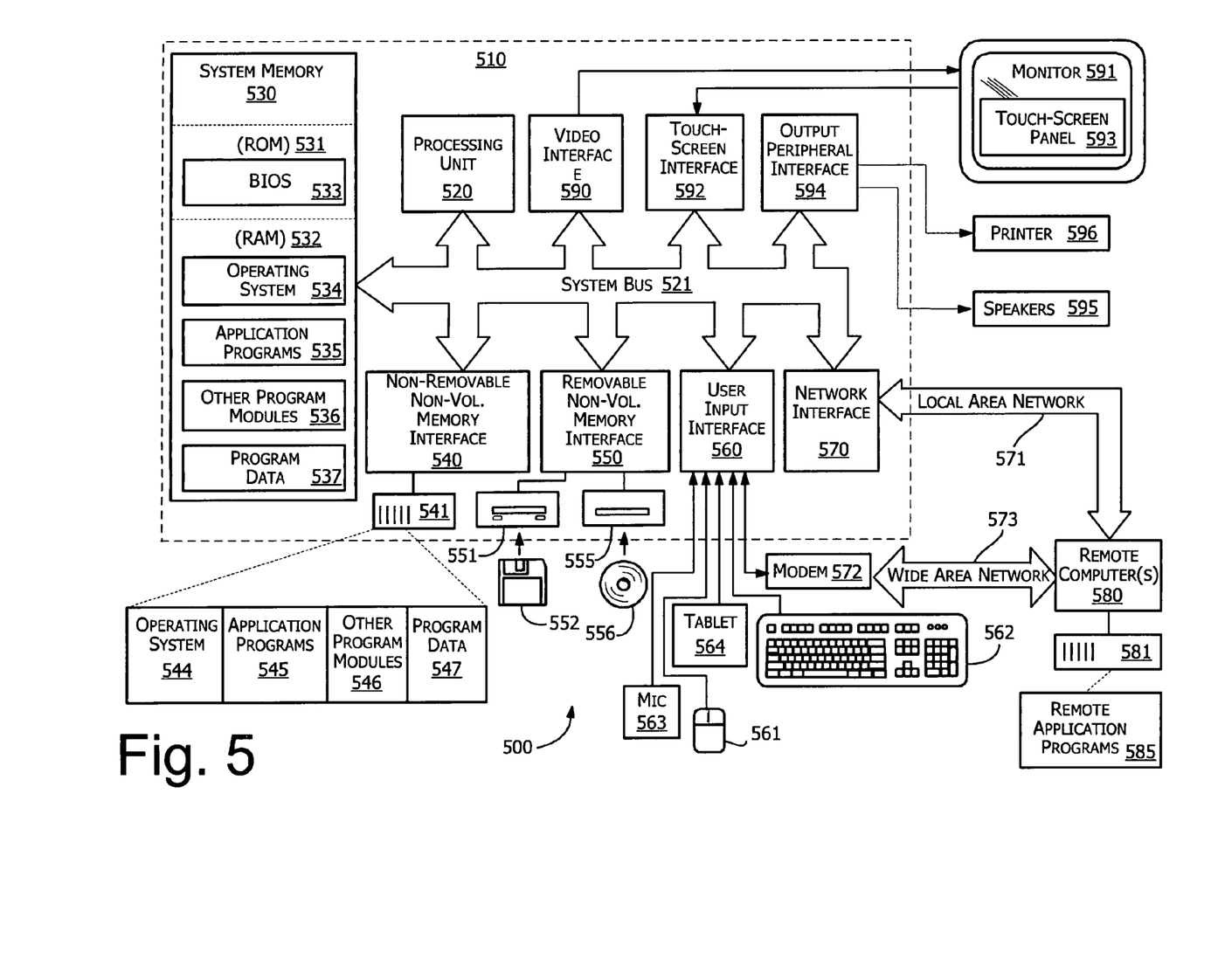
FIG. 5 illustrates a system that may be useful in implementing the described technology.

Example hardware and an operating environment are shown in FIG. 5 for implementing the technology hereof, these including a general purpose computing device in the form of a computer 520, including a processing unit 521, a system memory 522, and a system bus 523 that operatively couples various system components including the system memory to the processing unit 521. There may be only one or there may be more than one processing unit 521, such that the processor of computer 520 comprises a single central-processing unit (CPU), or a plurality of processing units, commonly referred to as a parallel processing environment. The computer 520 may be a conventional computer, a distributed computer, or any other type of computer; the invention is not so limited.

The system bus 523 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 524 and random access memory (RAM) 525. A basic input/output system (BIOS) 526, containing the basic routines that help to transfer information between elements within the computer 520, such as during start-up, is stored in ROM 524. The computer 520 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 are connected to the system bus 523 by a hard disk drive interface 532, a magnetic disk drive interface 533, and an optical disk drive interface 534, respectively. The drives and their associated computer-readable media provide nonvolatile storage of computer-readable instructions, data structures, program modules and other data for the computer 520. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 529, optical disk 531, ROM 524, or RAM 525, including an operating system 535, one or more application programs 536, other program modules 537, and program data 538. A user may enter commands and information into the personal computer 520 through input devices such as a keyboard 540 and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port, or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The computer 520 may operate in a networked environment using logical connections to one or more remote computers, such as remote computer 549. These logical connections are achieved by a communication device coupled to or a part of the computer 520; the invention is not limited to a particular type of communications device. The remote computer 549 may be another computer, a server, a router, a network PC, a client, a peer device or other common network node, and typically includes many or all of the elements described above relative to the computer 520, although only a memory storage device 550 has been illustrated in FIG. 5. The logical connections depicted in FIG. 5 include a local-area network (LAN) 551 and a wide-area network (WAN) 552.

Such networking environments are commonplace in office networks, enterprise-wide computer networks, intranets and the Internet, which are all types of networks.

When used in a LAN-networking environment, the computer 520 is connected to the local network 551 through a network interface or adapter 553, which is one type of communications device. When used in a WAN-networking environment, the computer 520 typically includes a modem 554, a network adapter, a type of communications device, or any other type of communications device for establishing communications over the wide area network 552. The modem 554, which may be internal or external, is connected to the system bus 523 via the serial port interface 546. In a networked environment, program modules depicted relative to the personal computer 520, or portions thereof, may be stored in the remote memory storage device. It is appreciated that the network connections shown are examples only and other means of and communications devices for establishing a communications link between the computers may be used.

In an example implementation, a detection module, and an enforcement module, and/or other modules may be incorporated as part of the operating system 535, application programs 536, or other program modules 537. Transaction logs, enlistment records, and other data may be stored as program data 538.

The technology described herein may be implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification provides a complete description of the structure and use of example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. In particular, it should be understood that the described technology may be employed in virtually all, if not indeed, all media content receivers and/or any associated playback devices. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

Accordingly, what is claimed is:

1. A method of managing the use of media content ratings information by a media content receiver, the method comprising:
   communicating in-band media content for a particular program to a media content receiver of an end-user for presentation of the media content for the particular program by the media content receiver of the end-user; and
   communicating non-in-band media content ratings information for the particular program to the media content receiver of the end-user, the non-in-band media content ratings information for the particular program being communicated to the media content receiver of the end-user discretely from the media content for the particular program in a separate communication,
   wherein the media content receiver of the end-user is configured to be programmed to:
      block playback of the media content for the particular program that has been received by the media content receiver of the end-user according to any in-band media content ratings information for the particular program contained in the media content for the particular program, and
      block playback of the media content for the particular program that has been received by the media content receiver of the end-user according to the non-in-band media content ratings information for the particular program that has been received by the media content receiver of the end-user in the separate communication.

2. A method according to claim 1 wherein the communicating non-in-band media content ratings information includes one or both of transmitting and receiving the non-in-band media content ratings information.

3. A method according to claim 1 wherein the communicating non-in-band media content ratings information includes receiving the non-in-band media content ratings information at the media content receiver of the end-user.

4. A method according to claim 1 wherein the communicating non-in-band media content ratings information includes transmitting the non-in-band media content ratings information to the media content receiver of the end-user.

5. A method according to claim 1 wherein the media content for the particular program does not contain in-band media content ratings information for the particular program, and the non-in-band media content ratings information for the particular program is communicated to the media content receiver of the end-user over a network from a web service that collects media content ratings information.

6. A method according to claim 1 wherein the media content for the particular program contains in-band media content ratings information for the particular program, the method further comprising:
   determining a change in the in-band media content ratings information for the particular program.

7. A method according to claim 6 further comprising:
   communicating the non-in-band media content ratings information for the particular program in response to the determining a change in the in-band media content ratings information for the particular program.

8. A method according to claim 1 wherein the media content for the particular program contains in-band media content ratings information for the particular program, the method further comprising:
   determining a difference in the in-band media content ratings information for the particular program relative to a previously accepted ratings schema utilized by the media content receiver of the end-user;

blocking playback of the media content for the particular program containing the in-band media content ratings information; and communicating a query for updated media content ratings information in response to the determining a difference in the in-band media content ratings information for the particular program.

9. A method according to claim 8 further comprising:

communicating a non-in-band ratings schema discretely from the media content for the particular program containing the in-band media content ratings for the particular program.

10. A method according to claim 8 wherein the determining a difference in the in-band media content ratings information for the particular program is relative to one or more of an in-band ratings schema, a non-in-band ratings schema, and a ratings schema hard-coded in the media content receiver of the end-user.

11. A method according to claim 1 wherein the non-in-band media content ratings information includes a rating code for the particular program.

12. A method according to claim 11 wherein the non-in-band media content ratings information includes a ratings schema for the rating code for the particular program.

13. A method according to claim 1 wherein the media content receiver of the end-user is configured to present the non-in-band media content ratings information for management thereof by the end-user.

14. A method according to claim 1 wherein the media content receiver of the end-user is one or both of digital or analog.

15. A method according to claim 1 further comprising:

managing presentation of the media content for the particular program that has been received by the media content receiver of the end-user in accordance with the non-in-band media content ratings information.

16. A method according to claim 15 wherein the managing includes one or more of presenting the non-in-band media content ratings information for end-user decision-making, blocking media content for the particular program, filtering media content for the particular program, and presenting guide information in an arrangement based on ratings information criteria.

17. A computer program storage medium readable by a computing device and encoding a computer program for managing the use of media content ratings information by a media content receiver, the computer program storage medium comprising computer-readable instructions for the computer program that, when executed, cause the computing device to perform a method comprising:

communicating an in-band media content signal to a media content receiver of an end-user for presentation of media content for a particular program by the media content receiver of the end-user; and communicating a non-in-band media content ratings information signal for the particular program to the media content receiver of the end-user, the non-in-band media content ratings information signal for the particular program being communicated to the media content receiver of the end-user discretely from the media content signal in a separate communication, wherein the media content receiver of the end-user is configured to be programmed to:

block playback of the media content for the particular program that has been received by the media content receiver of the end-user according to any in-band media content ratings information for the particular program contained in the media content for the particular program, and block playback of the media content for the particular program that has been received by the media content receiver of the end-user in the media content signal according to the non-in-band media content ratings signal for the particular program that has been received by the media content receiver of the end-user in the separate communication.

18. A computer program storage medium according to claim 17 wherein the non-in-band media content ratings information signal provides a rating code for the particular program and a ratings schema for generating a value from the rating code for the particular program that can be used by the media content receiver of the end-user, as programmed by the end-user, to block playback of the media content for the particular program that has been received by the media content receiver of the end-user.

19. A system for the use of parental ratings information comprising:

a media content receiver of an end-user for receiving in-band media content for a particular program for presentation by the media content receiver of the end-user and for receiving non-in-band media content ratings information for the particular program, the non-in-band media content ratings information for the particular program being received discretely from the media content for the particular program in a separate communication, wherein the media content receiver of the end-user is configured to be programmed to:

block playback of the media content for the particular program that has been received by the media content receiver of the end-user according to any in-band media content ratings information for the particular program contained in the media content for the particular program, and block playback of the media content for the particular program that has been received by the media content receiver of the end-user according to the non-in-band media content ratings information for the particular program that has been received by the media content receiver of the end-user in the separate communication.

20. A system according to claim 19 wherein the non-in-band media content ratings information includes a rating code for the particular program and a ratings schema for generating a value from the rating code for the particular program that can be used by the media content receiver of the end-user, as programmed by the end-user, to block playback of the media content for the particular program that has been received by the media content receiver of the end-user.

* * * * *